(12) United States Patent
Hugosson

(10) Patent No.: US 11,343,472 B2
(45) Date of Patent: May 24, 2022

(54) ASSOCIATING CAPTURED MEDIA TO A PARTY

(71) Applicant: Axis AB, Lund (SE)

(72) Inventor: Fredrik Hugosson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/108,158

(22) Filed: Dec. 1, 2020

(65) Prior Publication Data
US 2021/0297636 A1   Sep. 23, 2021

(30) Foreign Application Priority Data

Mar. 17, 2020  (EP) .................................... 20163597

(51) Int. Cl.
| | | |
|---|---|---|
| H04N 7/18 | (2006.01) | |
| G11B 27/34 | (2006.01) | |
| H04L 9/06 | (2006.01) | |

(52) U.S. Cl.
CPC ............. *H04N 7/185* (2013.01); *G11B 27/34* (2013.01); *H04L 9/06* (2013.01); *H04N 7/188* (2013.01)

(58) Field of Classification Search
None
See application file for complete search history.

(56) References Cited

U.S. PATENT DOCUMENTS

| | | | |
|---|---|---|---|
| 6,876,984 B2 | 4/2005 | Tadayon et al. | |
| 7,983,440 B1* | 7/2011 | Roberts ............. | H04N 1/32336 382/100 |
| 8,311,393 B2* | 11/2012 | Kawaoka ........... | H04N 1/00453 386/288 |
| 9,699,401 B1* | 7/2017 | Jones ................ | H04N 21/25841 |
| 9,930,308 B2* | 3/2018 | Balko ..................... | G06F 12/00 |
| 10,178,352 B2* | 1/2019 | Goldfeder .............. | H04H 20/04 |
| 10,931,921 B2* | 2/2021 | Goldfeder .............. | H04H 20/04 |
| 2003/0046578 A1 | 3/2003 | Brown et al. | |
| 2006/0195886 A1* | 8/2006 | Ashley ................ | H04N 21/235 725/138 |
| 2007/0073694 A1 | 3/2007 | Picault et al. | |

(Continued)

FOREIGN PATENT DOCUMENTS

| | | |
|---|---|---|
| EP | 2249256 A1 | 11/2010 |
| WO | 2016/033523 A1 | 3/2016 |

OTHER PUBLICATIONS

Extended European Search Report dated Jun. 30, 2020 for the European Patent Application No. 20163597.6.

(Continued)

*Primary Examiner* — Gelek W Topgyal
(74) *Attorney, Agent, or Firm* — Volpe Koenig

(57) ABSTRACT

A portable device, and a method performed in a portable device, for associating media captured by the portable device to one or more parties having requested the media to be captured at one or more locations. The method comprises: receiving information associating each of the one or more parties with a location; dynamically determining a location of the portable device; dynamically associating the media captured by the portable device to the one or more parties, such that media currently being captured by the portable device is associated with a party that according to the received information is associated with a current location of the portable device.

12 Claims, 3 Drawing Sheets

(56) References Cited

U.S. PATENT DOCUMENTS

| | | |
|---|---|---|
| 2008/0092181 A1* | 4/2008 | Britt ................. H04N 21/47202 |
| | | 725/87 |
| 2009/0009605 A1 | 1/2009 | Ortiz |
| 2009/0148152 A1* | 6/2009 | Kurane ................. G03B 29/00 |
| | | 396/429 |
| 2010/0097494 A1 | 4/2010 | Gum et al. |
| 2014/0368601 A1* | 12/2014 | deCharms ............... H04L 67/26 |
| | | 348/14.02 |
| 2015/0134949 A1* | 5/2015 | Baldwin ............ H04L 63/0471 |
| | | 713/153 |
| 2016/0014176 A1 | 1/2016 | Ariav et al. |
| 2016/0062992 A1 | 3/2016 | Chen et al. |
| 2017/0102999 A1 | 4/2017 | Hickman et al. |
| 2017/0337791 A1 | 11/2017 | Gordon-Carroll |
| 2017/0374643 A1* | 12/2017 | Tuscano .................. H04L 47/29 |
| 2018/0062995 A1* | 3/2018 | Naar ................... H04L 63/0428 |
| 2018/0075562 A1 | 3/2018 | Hanchett, Jr. et al. |
| 2019/0392542 A1 | 12/2019 | Smith et al. |

OTHER PUBLICATIONS

Communication pursuant to Article 94(3) EPC dated May 10, 2021 for European Patent Application No. 20163597.6.

\* cited by examiner

ASSOCIATING CAPTURED MEDIA TO A PARTY

TECHNICAL FIELD

The present invention relates to a method, performed in a portable device, for associating media captured by the portable device to one or more parties having requested the media to be captured at one or more locations.

BACKGROUND

Monitoring of public and private sites are common and can include combinations of monitoring cameras and guard patrols depending on the requirements for each specific site. For some sites, such as military areas or public schools, it can be very important that any information related to the sites (e.g. buildings, personnel, or students) is not made available to unauthorized persons.

In private security, guards are typically equipped with cameras that are used to capture media, such as images, video, or audio, related to the sites. A guard is also usually assigned to perform work for several different clients during each shift. He or she may therefore patrol sites belonging to different clients during a single shift. Hence, it may be problematic to handle the captured media in accordance with the requirements for each specific site. For example, it may be cumbersome or problematic to sort the recorded media such that each respective client receives the correct media. This may be performed by, e.g., the guard manually tagging the media with information identifying each respective client. However, such a solution is prone to errors, where the guard may forget to tag the media, and that may lead to accidental loss of information that may be vital to the client. For this reason, the sorting of media recordings is typically handled after the guard has completed the work shift. However, it may be difficult and cumbersome to correctly identify and sort the media to each respective client.

SUMMARY

Mitigating, alleviating or eliminating one or more of the above-identified deficiencies in the art and disadvantages singly or in any combination would be beneficial.

According to a first aspect a method, performed in a portable device, for associating media captured by the portable device to one or more parties having requested the media to be captured at one or more locations is provided. The method comprising: receiving information associating each of the one or more parties with a location; dynamically determining a location of the portable device; dynamically associating the media captured by the portable device to the one or more parties, such that media currently being captured by the portable device is associated with a party that according to the received information is associated with a current location of the portable device.

The portable device may be a portable camera, such as a body-worn camera.

By a party having requested media to be captured at a location is meant a party having assigned or ordered a user of the portable device to capture video at the location. The party is hence typically an external party being different from the user. The party may be an end-user of the captured media.

As used herein the wording "media" refers to data captured by a sensor of the portable device. For example, it may refer to images, video, and/or audio. It may also refer to other types of sensor data, e.g., radar data, IR data, temperature data, etc.

Within the context of this disclosure, "dynamically determining a location of the portable device" is to be construed as the location is determined repeatedly over time. The location of the portable device may be determined continuously, or substantially continuously, over time. Likewise, "dynamically associating the media captured by the portable device to one or more parties" means that the association is carried out repeatedly over time.

Within the context of this disclosure, "a location" is not to meant be construed as only relating to a static geographical position. Instead the location is herein a broader concept, as it may refer to a moving structure, e.g., a train, a bus or a boat. Hence, the location may be a stationary location (i.e. a geographical location, e.g., a building) or a mobile location (e.g. a train or a bus). Further, the location may be at more than one geographical position, e.g., it may be different buildings associated with the party each at their own geographical position. For example, a party may be associated with buildings in a plurality of different cities and/or parts of a city, and all these buildings may be a location within this context.

By means of the present concepts, the captured media is automatically associated to a party in the portable device, without a user of the portable device needing to manually tag the captured media with information associated with the party, thereby reducing risks associated with the captured media being made available to other than the relevant party. Thus, the present concepts allow for the captured media to be associated with each respective party based on the dynamically determined location, thereby allowing for the captured media to be handled according to the requirements of each respective party.

The step of receiving information associating each of the one or more parties with a location may be performed when the portable device is connected to a docking station.

A possible associated advantage is that the information associating each of the one or more parties with a location may be received via a wired connection. By receiving the information via a wired connection, a wireless bandwidth consumption of the portable device may be reduced, and/or security related to the transfer of the information associating each of the one or more parties with a location may be enhanced.

The method may further comprise tagging the media currently being captured by the portable device with information identifying the party.

A possible associated advantage of tagging the captured media may be that the information associated with the party is saved as metadata of the captured media, thereby allowing for information identifying the party directly from the captured media and whereby automatic handling of the captured media based on the party is allowed.

The step of dynamically determining the location of the portable device may comprise one or more of: determining a geographic position of the portable device; determining a connection to a location beacon; registering a location tag arranged at the location; and comparing a present time with a guard schedule.

A possible associated advantage is that a detailed and/or precise determination of the location may be allowed.

The method may further comprise: transmitting media being associated with a party to a data storage in control by that party.

A possible associated advantage is that the captured media may, subsequent to transmitting, be accessible to the party, but not to other parties. Further, this allows for different parties to use different types of data storages. For example, some parties may use cloud-based data storage, while others may require media to be stored in databases on their premises.

The method may further comprise: encrypting the media being associated with a party using an encryption key associated with that party.

A possible associated advantage is that an accessibility to the captured media may be restricted. The access to the captured media may then be restricted to the holder of the corresponding decryption key, e.g. the party. The captured media may, e.g., only be accessible to the party of the captured media. Hence, the security related to the captured media may be enhanced.

The method may further comprise: encoding the media being associated with a party in accordance with a media quality preference associated with that party. The media quality preference associated with a party may be indicative of a media quality requested by the party. For example, it may be indicative of a level of compression desired by the party. This is advantageous in that it enables the portable device to produce media with different media quality for different parties, even when the same portable device is used to capture media requested by a plurality of parties. In this way, a flexible solution is achieved since different parties may have different needs and different interest in paying for storage of high quality media.

The method may further comprise: comparing the dynamically determined location of the portable device and the information associating each of the one or more parties with a location; and upon finding that the portable device enters a location associated with a party, starting capturing of a media recording. The capturing of a media recording may be started in case no media is currently being captured. In a situation where the portable device currently captures media when entering the location, the portable device may terminate the current media recording, and start a new media recording. In this way, one can avoid that a media recording is accidentally associated with more than one party or with the wrong party.

A possible associated advantage is that a media recording may be started automatically when the portable device enters a location which is associated with a party, thereby reducing a risk of accidental loss of the user of the portable device forgetting to manually start the capturing of the media, whereby an accidental loss of information that may be important to the party may be avoided.

The method may further comprise: comparing the dynamically determined location of the portable device and the information associating each of the one or more parties with a location; and upon finding that the portable device leaves a location associated with a party, stopping capturing of a current media recording. This may further be followed by the portable device starting a new media recording as it leaves the location associated with the party.

A possible associated advantage is that capturing of the media may be stopped automatically when the portable device determines that it is not at a location which is associated with a party of the one or more parties, thereby reducing a risk of accidental associating of captured media to a wrong and/or unauthorized party, whereby a security associated with the captured media may be increased. The comparing may be performed dynamically, i.e., may be repeated over time.

According to a second aspect a portable device is provided. The portable device comprises: a sensor configured to capture media; and circuitry configured to execute: a receive function configured to receive information associating one or more parties with a location, each of the one or more parties having requested media to be captured at one or more respective locations, a location function configured to dynamically determine a location of the portable device, and an association function configured to dynamically associate the media captured by the portable device to the one or more parties, such that media currently being captured by the portable device is associated with a party that according to the received information is associated with a current location of the portable device.

The above-mentioned features of the first aspect, when applicable, apply to this second aspect as well. In order to avoid undue repetition, reference is made to the above.

The portable device may further comprise: a clock configured to determine a present time; and a location sensor configured to determine one or more of: a geographic position of the portable device, and a connection to a location beacon, and wherein the location function may be configured to determine the location of the portable device based on one or more of: the geographic position of the portable device, the connection to the location beacon, and the present time.

The portable device may further comprise: a receiver configured to register a location tag arranged at the location; and wherein the location function may be further configured to determine the location of the portable device by registering the location tag.

The circuitry may be further configured to execute: a transmit function configured to transmit media being associated with a party to a data storage in control by that party.

The circuitry may be further configured to execute: an encryption function configured to encrypt media being associated with a party using an encryption key associated with that party.

The circuitry may be further configured to execute: a comparison function configured to compare the dynamically determined location of the portable device and the information associating each of the one or more parties with a location; and a capture function configured to start capturing of a media recording in response to finding that the portable device has entered a location associated with a party and/or to stop capturing of a current media recording in response to finding that the with the portable device has left a location associated with a party.

According to a third aspect a non-transitory computer-readable storage medium is provided. The non-transitory computer-readable storage medium comprises program code portions that, when executed on a device having processing capabilities, perform the method according to the first aspect.

The above-mentioned features of the first aspect and/or the second aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred variants of the present concepts, are given by way of illustration only, since various changes and modifications within the scope of the concepts will become apparent to those skilled in the art from this detailed description.

Hence, it is to be understood that the concepts are not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps. The steps of any method disclosed herein do not have to be performed in the exact order disclosed, unless explicitly stated.

BRIEF DESCRIPTION OF THE DRAWINGS

The above and other aspects of the present concepts will now be described in more detail, with reference to appended drawings showing variants. The figures should not be considered limiting to the specific variants; instead they are used for explaining and understanding the concepts.

As illustrated in the figures, the sizes of layers and regions are exaggerated for illustrative purposes and, thus, are provided to illustrate the general structures of variants of the present concepts. Like reference numerals refer to like elements throughout.

DETAILED DESCRIPTION

The present concepts will now be described more fully hereinafter with reference to the accompanying drawings, in which currently preferred variants of the concepts are shown. This concepts may, however, be implemented in many different forms and should not be construed as limited to the variants set forth herein; rather, these variants are provided for thoroughness and completeness, and fully convey the scope of the present concepts to the skilled person.

Figure 1A:
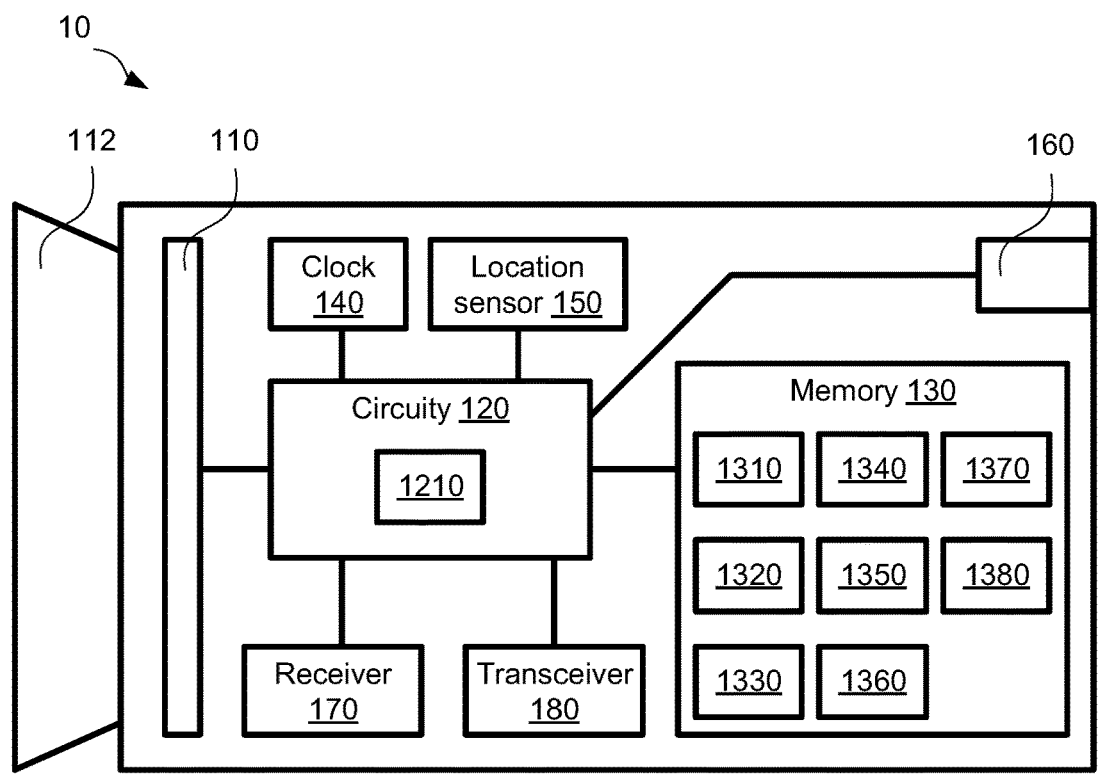
FIG. 1A illustrates a portable device.

FIG. 1A illustrates a portable device 10. The portable device 10 comprises a sensor 110 configured to capture media. The sensor 110 may be an image sensor, an audio sensor (e.g. a microphone), an IR sensor, a radar sensor, a temperature sensor, etc. In the example shown in FIG. 1A, the sensor 110 is an image sensor, and will be referred to hereinafter to as the image sensor 110.

As shown in the example of FIG. 1A, the portable device 10 may be a camera comprising imaging optics 112. The portable device 10 may comprise an internal power source (not shown) and/or external power source (not shown), such as a battery. The portable device 10 may comprise a display (not shown). The portable device 10 may be configured to display information and/or the captured media on the display. The display may be a touch screen configured to let a user of the portable device 10 to interact with the portable device 10, e.g. to manually start/stop recordings. The portable device 10 may comprise hardware controls, such as control buttons and/or wheels configured to allow the user of the portable device 10 to control the portable device 10. The imaging optics 112 may be arranged to image a scene onto the image sensor 110. The portable device 10 may be a body-worn camera.

The portable device 10 further comprises circuitry 120. The circuitry 120 is configured to perform one or more functions of the portable device 10. As shown in the example of FIG. 1A, the circuitry 120 may comprise a processor 1210. The processor 1210 may be a central processing unit (CPU), a microcontroller, and/or a microprocessor.

The circuitry 120 is configured to execute: a receive function 1310, a location function 1320, and an association function 1330. The portable device 10 may comprise a memory 130 configured to communicate with the circuitry 120. The memory 130 may be configured to store the receive function 1310, the location function 1320, and the association function 1330. It is to be understood that the memory 130 may be configured to store additional functions related to the operation of the portable device 10. The memory 130 may be configured to store media captured by the image sensor 110. The memory 130 may be a non-transitory computer-readable storage medium. The processor 1210 may be configured to execute one or more functions stored on the memory 130.

The receive function 1310 is configured to receive information associating one or more parties with a location, each of the one or more parties having requested media to be captured at one or more respective locations. The memory 130 may be configured to store the information associating the one or more parties with a location. The information associating each of the one or more parties with a location may comprise one or more of: a list correlating each party with a geographical position; a list correlating each party with a location beacon; and a list correlating each party with a location tag. The receive function 1310 may be configured to receive the information associating each of the one or more parties with a location prior to the media being captured at the location. The circuitry 120 may be configured to execute the receive function 1310 when the portable device 10 is connected to a docking station. The portable device 10 may comprise a socket 160 arranged to be connected to the docking station via a wired connection and to facilitate the circuitry 120 to communicate with the docking station. It is to be understood that the wired connection may comprise a short-range wireless connection, e.g., a short-range inductive connection or Near Field Communication (NFC). The docking station may be configured to communicate to a server, and thereby to allow the circuitry 120 to communicate with the server via the docking station when the portable device 10 is connected to the docking station via the socket 160. The information associating each of the one or more parties with a location may be sent from the server. The information associating each of the one or more parties with a location may be sent in connection to an administrator preparing the portable device 10 for removal from the docking station. In other words, the information associating each of the one or more parties with a location may be sent in connection to a configuration and/or a setup of the portable device 10. By receiving the information via the wired connection, a wireless bandwidth consumption of the portable device 10 may be reduced, and/or security related to the transfer of the information associating each of the one or more parties with a location may be enhanced.

The location function 1320 is configured to dynamically determine a location of the portable device 10.

The association function 1330 is configured to dynamically associate the media captured by the portable device 10 to the one or more parties. In particular, the association function 1330 is configured to associate media currently being captured by the sensor 110 with a party that according to the received information is associated with a current location of the portable device. In this way, different portions of the captured media, such as different media recordings, may be associated with different parties depending on the location where the media was captured.

Thus, the captured media is associated to the one or more parties in the portable device 10, without a user of the portable device 10 needing to manually tag the captured media with information associated with the party, thereby reducing risks associated with the captured media being made available to other than its party. Hence, the captured media may be associated with each respective party based on the dynamically determined location of the portable device 10, thereby allowing for the captured media to be handled according to the requirements of each respective party. These handling requirements may, e.g., include encryption, storage locations etc.

As is shown in the example of FIG. 1, the circuitry 120 may be further configured to execute a tagging function 1360 configured to tag the media currently being captured by the portable device with information identifying the party. The information identifying the party may comprise a name and/or an identification of the party. The identification of the party may be an alphanumeric code used to identify the party, e.g., a client number. The tagging may include providing the information identifying the party as metadata.

As shown in the example of FIG. 1, the portable device 10 may further comprise a clock 140 and a location sensor 150 configured to communicate with the circuitry 120.

The clock 140 may be configured to determine a present time. The clock 140 may be configured to communicate the present time to the circuitry 120.

The location sensor 150 may be configured to determine one or more of: a geographic position of the portable device 10, and a connection to a location beacon. The location sensor may comprise a sensor for a Global Navigation Satellite System (GNSS), e.g., Global Positioning System (GPS). The sensor for the GNSS may be configured to determine the geographic position of the portable device 10. The location sensor may be configured to determine the connection to a location beacon via a wireless communications protocol, e.g., Wi-Fi, Bluetooth and/or Near Field Communication (NFC). The location sensor may, e.g., detect a Wi-Fi network name (SSID) or a Bluetooth/NFC beacon. The location beacon may be a wireless beacon. The wireless beacon may utilize one or more of Wi-Fi, Bluetooth, NFC. The location beacon may broadcast information identifying the location. The portable device 10 may comprise information correlating locations with location beacons.

The location function 1320 may be configured to determine the location of the portable device 10 based on one or more of: the geographic position of the portable device 10, the connection to the location beacon, and the present time.

The location function 1320 may determine the location of the portable device 10 by comparing the geographic position of the portable device 10 determined by the location sensor 150 with information (e.g. a list or a table) correlating locations with geographical positions. The receive function 1310 may be further configured to receive the information correlating locations with geographical positions. The information correlating locations with geographical positions may be stored on the memory 130. The information correlating locations with geographical positions may be received by the portable device 10 in connection with the information associating each of the one or more parties with a location being received by the portable device 10.

The location function 1320 may determine the location by receiving information emitted by the location beacon identifying the location. The location function 1320 may determine the location of the portable device 10 by comparing the connection to a location beacon determined by the location sensor 150 with information (e.g. a list or a table) correlating locations with location beacons. The receive function 1310 may be further configured to receive the information correlating locations with location beacons. The information correlating locations with location beacons may be stored on the memory 130. The information correlating locations with location beacons may be received by the portable device 10 in connection with the information associating each of the one or more parties with a location being received by the portable device 10.

The location function 1320 may determine the location of the portable device 10 by comparing the present time with a guard schedule. The guard schedule may correlate times with locations, e.g., as a list detailing the times at which the user of the portable device 10 is scheduled to visit the different locations. Hence, by comparing the present time with the guard schedule, the location function 1320 may determine the location of the portable device 10. The receive function may be further configured to receive the guard schedule. The guard schedule may be received by the portable device 10 in connection with the information associating each of the one or more parties with a location being received by the portable device 10. The receive function 1310 may be further configured to receive the guard schedule.

As is shown in the example of FIG. 1A, the portable device may further comprise a receiver 170 configured to register a location tag arranged at the location. The receiver 170 may be configured to register the location tag via a wireless communications protocol, e.g., Wi-Fi, Bluetooth and/or NFC. The location tag may be a Radio-Frequency Identification (RFID) tag.

The location function 1320 may be further configured to determine the location of the portable device 10 by registering the location tag. The location function 1320 may be further configured to determine the location of the portable device 10 by comparing the location tag registered by the receiver 170 with information (e.g. a list or a table) correlating location tags with locations. Alternatively, or additionally, the location tag may transmit information identifying the location upon being registered by the receiver 170 of the portable device. The receive function 1310 may be further configured to receive the information correlating locations with location tags. The information correlating locations with location tags may be stored on the memory 130. The information correlating locations with location tags may be received by the portable device 10 in connection with the information associating each of the one or more parties with a location being received by the portable device 10.

The circuitry may be further configured to execute a transmit function 1340 configured to transmit media being associated with a party to a data storage in control by that party. The data storage may be in exclusive control by the party, i.e. no one other than the party has access to the data storage. The portable device 10 may further comprise a transceiver 180 configured to transmit and receive data. The transceiver 180 may communicate via a wired (e.g., Ethernet, USB, etc.) or a wireless connection (e.g., Bluetooth, Wi-Fi, cellular data such as 3G, 4G, 5G, etc). The transmit function 1340 may be configured to instruct the transceiver 180 to transmit the captured media to the data storage in control by the party. The captured media may be transmitted to the data storage directly from the portable device 10 and/or via the docking station. The protocol used to transmit the captured media to the data storage may be selected based on the party of the captured media. For example, a party may require that a high-security protocol is used when transmitting the captured media to the data storage.

Alternatively, or additionally, the transmit function may be configured to live stream the media currently being captured at the location to a stream receiver associated with the party associated with the current location. The stream receiver may comprise a front end. The front end of the stream receiver may be used by personnel assigned to monitor the media currently being captured at the location. In such case, in response to the dynamically determined location of the portable device being associated with a different party, the transceiver may live stream the media currently being captured at the location to a stream receiver associated with the different party and/or transmitted to a data storage associated with the different party.

A skilled person realizes that there are a plurality of different wired and wireless connections that may be suitable for transmitting the captured media. Non-limiting examples of wired connections comprise connections via Universal Serial Bus (USB) and/or Ethernet, and non-limiting examples of wireless connections comprise connections via Wi-Fi and/or cellular data (3G, 4G, and/or 5G).

The circuitry may be further configured to execute an encryption function 1350 configured to encrypt media being associated with a party using an encryption key associated with that party.

The encryption is typically carried out in real-time, i.e., media is encrypted as it is captured. The media is hence not written down on a local disk, such as a flash memory, in the portable device 10 prior to being encoded. This reduces the number of times data is written and read from the local disk, thus leading to a reduced wear of the local disk. The encryption function 1350 may be configured to encrypt the captured media further based on the party, e.g., by choosing an encryption algorithm based on requirements and/or preferences of the party. The encryption key associated with the party may be one encryption key of an encryption key pair associated with the party. The encryption key pair may comprise a public encryption key and a private encryption key. The encryption function 1350 may be configured to encrypt the captured media using the public encryption key of the encryption key pair. The private encryption key of the encryption key pair associated with the party may be restrictedly known by the party. The circuitry 120 may be configured to execute the encryption function 1350 prior to the transmit function 1340. Hence, the captured media may be encrypted prior to being transmitted to the data storage in control by the party associated with the captured media.

The circuitry may be configured to execute an encoding function configured to encode media being associated with a party in accordance with a media quality preference associated with that party. The encoding is carried out in real-time, i.e., encoded as it is captured. A media quality preference of a party may be indicative of a media quality requested by the party. The media quality may correspond to a compression level. The compression level may be given in terms of a target bitrate of the encoded media. For example, there may be a plurality of predefined media quality levels that a party may choose from, such as a "low media quality", "an intermediate media quality", "a high media quality". These may correspond to a "high compression level", an "intermediate compression level", and a "low compression level", respectively. Media quality preferences associated with the parties may be received by the receive function 1310 and may be stored in memory 130. The memory 130 may also store compression levels associated with the media qualities. For example, the memory 130 may store information that a first party associated with a first location has a first media quality preference, a second party associated with a second location has a second media quality preference, etc.

When encoding media associated with a party, the encoding function may compress the media to a compression level corresponding to the media quality requested by the party. For example, the encoding function may choose encoding settings, such as quantization level and frame rate, to achieve the desired compression level. This may involve performing automatic bitrate control, i.e., to set the quantization level and/or frame rate such that the bitrate of the encoded media meets a target bitrate as specified by the desired compression level. How to perform such bitrate control is per se known in the art and is therefore not discussed in more detail.

As shown in the example of FIG. 1, the circuitry may be further configured to execute a comparison function 1370. The comparison function 1370 may be configured to compare the dynamically determined location of the portable device 10 and the information associating each of the one or more parties with a location. In this way, the circuitry may detect when the portable device 10 enters or leaves a location associated with a party. The circuitry 120 may be further configured to execute a capture function 1380. The capture function 1380 may be configured to start capturing of a media recording in response to the comparison function 1370 finding that the portable device 10 enters a location associated with a party. If there is an ongoing media recording upon entering the location, the ongoing media recording may first be terminated before a new media recording is started. The capture function 1380 may be further configured to stop capturing of a current media recording in response to the comparison function 1370 finding that the portable device 10 has left a location associated with a party. Alternatively, or additionally, the capture function 1380 may be further configured to start and or stop capturing the media in response to manual input via, e.g. a button (not shown) of the portable device 10.

One or more of the image sensor 110, the circuitry 120, the memory 130, the clock 140, the location sensor 150, the socket 160, the receiver 170, and the transceiver 180 may communicate via a data bus (not shown).

Functions of the portable device 10 may be embodied in the form of executable logic routines (e.g., lines of code, software programs, etc.) that are stored on a non-transitory computer readable medium (e.g., the memory 130) of the portable device 10 and are executed by the circuitry 120 (e.g., using the processor 1210).

Figure 2A:
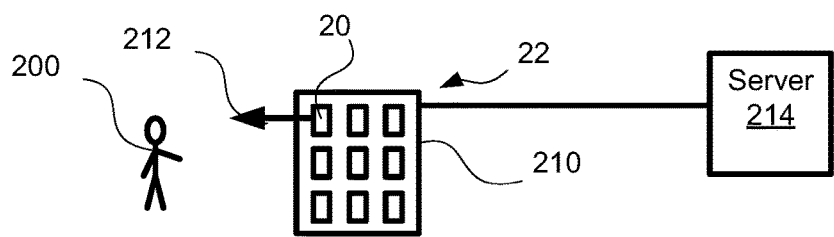
FIG. 2A-2E illustrate an example scenario where the portable device is used.

A method 30, illustrated as a flow chart in FIG. 3, performed in a portable device 20, for associating media captured by the portable device 20 to one or more parties having requested the media to be captured at one or more locations will now be described with reference to FIGS. 2A-2E and FIG. 3. In FIG. 2A-2E, an example scenario where a portable device 20 is used is described. FIG. 2A illustrates a user 200 retrieving (represented by arrow 212)

the portable device 20, in this example a body-worn camera, from a docking station 210. The portable device 20 illustrated in FIG. 2A-FIG. 2E may correspond to the portable device 10 discussed in relation to FIG. 1. The docking station 210 may comprise, as is shown in the example of FIG. 2A, a plurality 22 of portable devices. Which portable device 20 the user 200 is assigned may be determined by an administrator and indicated to the user 200 by, e.g., a light or a message on a display of the portable device 20 and/or on an information display arranged in connection with the docking station 210. In this example scenario, the user 200 is a guard assigned to patrol locations associated with four different parties. The user 200 may hereafter be referred to as the guard 200. The parties in this case are clients that have requested the guard 200 to visit the locations.

The method 30 comprises receiving S302 information associating each of the one or more parties with a location. In the example of FIG. 2, this is done in connection to removing the portable device 20 from the docking station 210, where information associating the clients with the location that each client has requested the guard 200 to visit is received by the portable device 20. Hence, the step of receiving S302 information associating each of the one or more parties with a location may be performed when the portable device 20 is connected to a docking station 210. In this specific example, the information associates a first client with a first location 2210, a second client with a second location 2220, a third client with a third location 2230, and a fourth client with a fourth location 2240. Each client may, e.g., own or rent respective location, and/or in some other manner be associated with respective location. In this specific example, an administrator prepares the portable device 20 for use of the guard 200, and in connection with the preparations, the information is sent to the portable device 20 from a server 214. The information (e.g. associating the clients to locations) may be sent to the portable device 20 each time the portable device 20 is connected to the docking station 210, and which information that is sent to the portable device 20 may thereby be related to which guard is to use the portable device 20. In other words, the user of the portable device 20 may use a portable device 20 having user-specific information stored thereon. Alternatively, or additionally, the portable device 20 may receive information only in a configuration/commissioning of the portable device 20. The received information may further include a media quality preference of each of the one or more parties. The media quality preference may correspond to a desired compression level of the media.

FIG. 2B-2E illustrate a planned route for the guard 200. The route comprises the first location 2210, the second location 2220, the third location 2230, and the fourth location 2240. The first location 2210 is a parking lot, and the second and third locations 2220, 2230 are buildings. Thus, the first, second, and third locations 2210, 2220, 2230 are stationary locations. The fourth location 2240 is a bus. Thus, as the bus is occasionally moving, the fourth location 2240 is a mobile location.

The method 30 further comprises dynamically determining S304 a location of the portable device 20, and dynamically associating S306 the media captured by the portable device 20 to the one or more parties, such that media currently being captured by the portable device 10, 20 is associated with a party that according to the received information is associated with a current location of the portable device 10, 20. In the example scenario shown in FIG. 2B-2E, four different manners in which the portable device 20 may be configured to determine its location and associate a party to media being captured at each location will be described. At each location 2210, 2220, 2230, 2240, the portable device 20 captures media which will be associated with a party (one of the clients in this example) according to the information associating each party to a location.

Figure 2B:
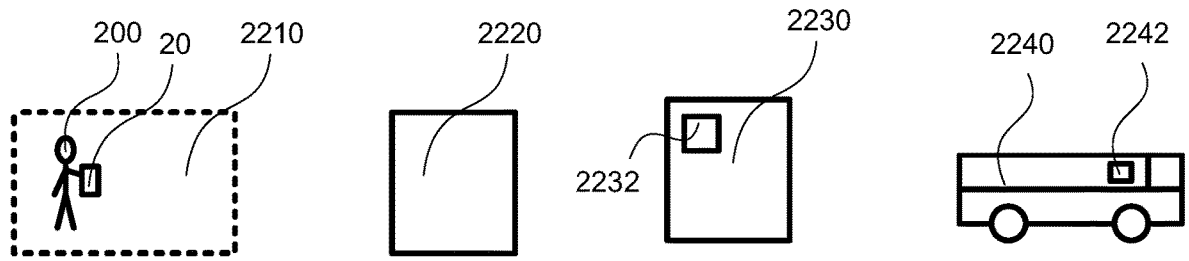
Figure 3:
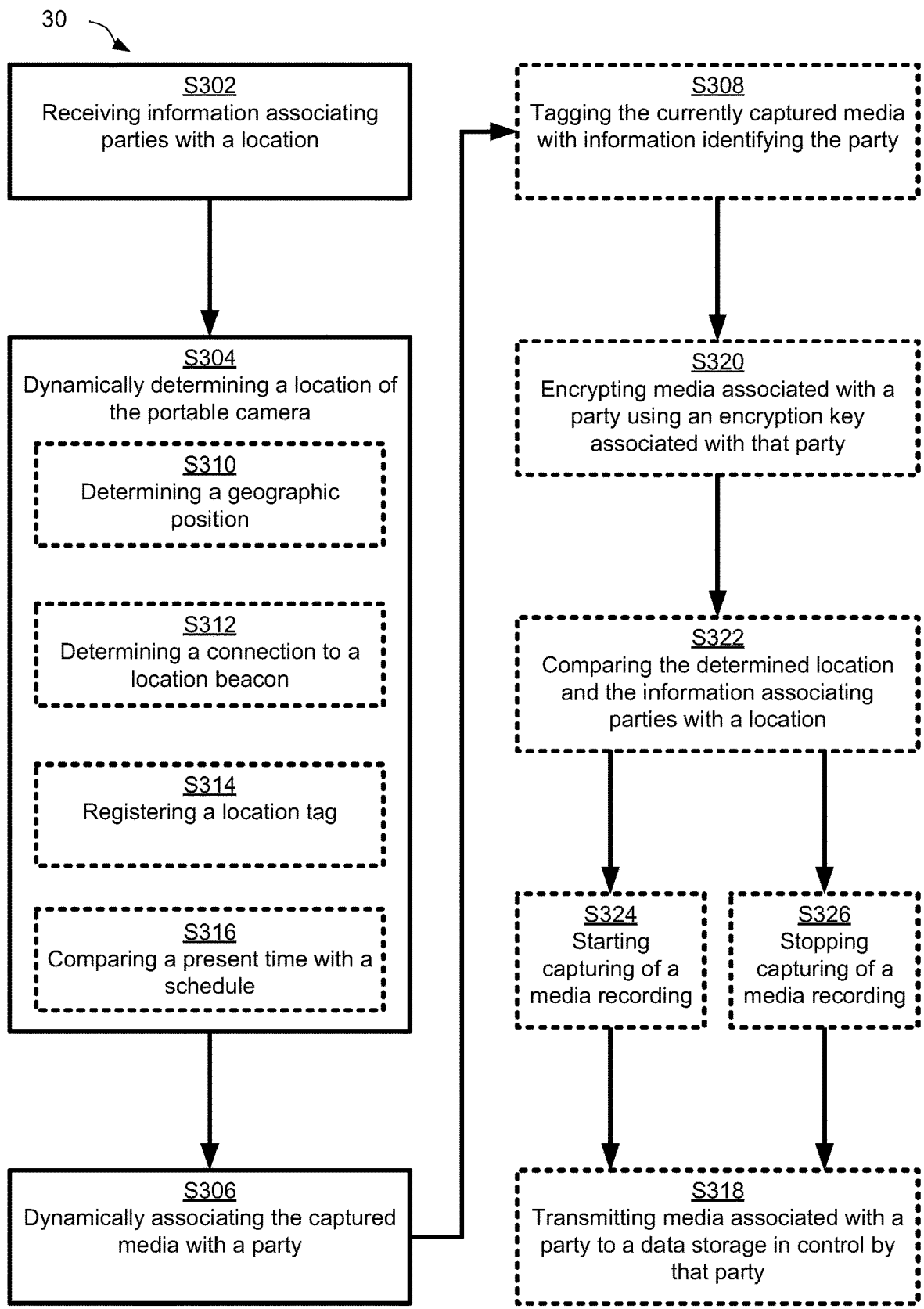
FIG. 3 is a block scheme of a method for associating media captured by the portable device to one or more parties having requested the media to be captured at one or more locations.

The step of dynamically determining S304 the location of the portable device 20 may comprise comparing S316 a present time with a guard schedule, which will be exemplified in the scenario described in relation to FIG. 2B. According to the guard schedule, the guard 200 is scheduled to arrive at the first location 2210 at a first time. The guard schedule was received in connection to receiving the information associating each client to a location. The guard schedule may correlate time with location. For example, the guard schedule may comprise a list of locations, and each location may be correlated with a time at which the location is to be visited by the guard.

The portable device 20 in this example comprises a clock which determines a present time, and when the present time is determined to be at, or past, the first time, the location of the portable device 20 is determined to be the first location 2210. The guard schedule may also comprise information relating to when the guard 200 is scheduled to leave the first location 2210. The method 30 may further comprise comparing S322 the dynamically determined location of the portable device 20 and the information associating each of the one or more parties with a location 2210, 2220, 2230, 2240. In this way, it may be detected when the portable device 20 enters or leaves a location associated with a party. Upon finding that the portable device 20 has entered a location associated with a party, capturing of a media recording may be started S324. Hence, in this example, the portable device 20 is configured to start capturing a new media recording when it has determined that it has arrived at the first location 2210. Alternatively, or additionally, the portable device 20 may be configured to start capturing a media recording in response to input from the user (the guard 200 in this example) and/or the administrator. Media captured when the guard 200 is present at the first location 2210 is associated with the first client. The media captured by the portable device 20 may hence include a plurality of media recordings. The start of a media recording may be initiated manually by the user at any time, or automatically by the portable device 20 upon a user entering a location being associated with a party. If there is an ongoing video recording as the portable device 20 enters a new location, the ongoing video recording may be terminated before starting a new video recording.

The method 30 may further comprise tagging S308 the media currently being captured by the portable device 10 with information associated with the party. In the example shown in FIG. 2B, the captured media is tagged with information associated with the first client, e.g., as the media is captured at the first location 2210, the media is tagged with a client number related to the first client.

Figure 2C:
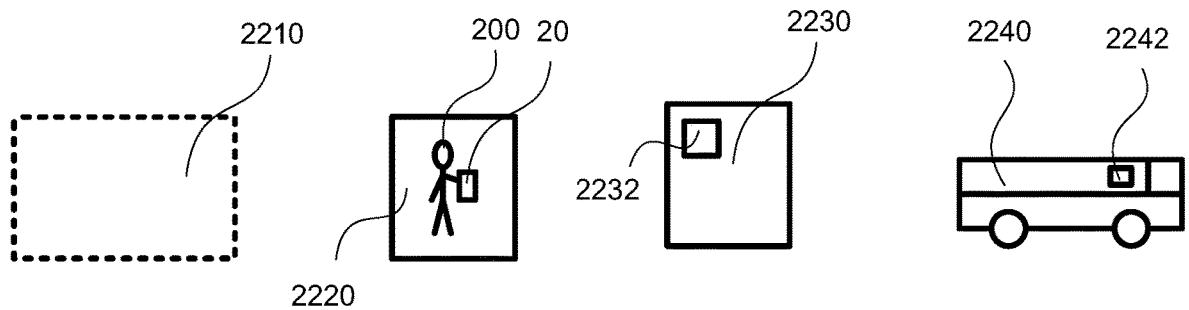

The step of dynamically determining S304 the location of the portable device 20 may comprise determining S310 a geographic position of the portable device 20, which will be described in relation to FIG. 2C. In FIG. 2C, the guard 200 has left the first location 2210 and arrives at the second location 2220. In this example, the first and the second locations 2210, 2220 are not adjacent or overlapping.

The method 30 may further comprise comparing S322 the dynamically determined location of the portable device 20 and the information associating each of the one or more parties with a location 2210, 2220, 2230, 2240. In this way, it may be detected when the portable device 20 enters or leaves a location associated with a party. Upon finding that the portable device 20 leaves a location associated with a party, the capturing of a current media recording may be stopped. Hence, in this example, the portable device 20 is configured to stop the recording in response to leaving the first location 2210. Thereafter, the portable device 20 may start a new video recording. Alternatively, or additionally, the portable device 10 may be configured to stop capturing media in response to input from the user (the guard 200 in this example) and/or the administrator. The stop of a media recording may hence be initiated manually by the user at any time, or automatically by the portable device 20 upon a user leaving a location being associated with a party. The media recordings captured while the portable device 20 is located at a certain location will, in real time, be associated with the party associated with that location (the first client in this example). It is to be understood that the portable device 20 may determine that the portable device 20 has left a location in a manner similar to as the portable device 20 determines that the portable device 20 arrives at a location. Alternatively, or additionally, the portable device 20 may be configured to associate media captured in between the first location 2210 and the second location 2220 with the first client. In other words, the portable device 20 may be configured to capture media and associate the captured media with the first party until the portable device 20 determines that the portable device 20 has arrived at a location associated with a different party. Alternatively, the portable device 20 may be configured to not associate media captured in between the first location 2210 and the second location 2220 with any particular party, or to associate it with the user of the portable camera 20. It is to be understood that the portable device 20 may be configured according to the above behavior independent on how the location of the portable device 20 is determined.

In this example, the portable device 20 determines that it has arrived at the second location 2220 by determining a geographic position of the portable device 20. The portable device 20 may also comprise information associating the locations to geographical positions, which in this case correlates the second location 2220 to a geographical position. The second location 2220 comprises a building, and the guard 200 is requested to patrol inside the building. In this example, the portable device 20 is unable to determine a geographical position when the guard 200 is inside the building. The portable device 20 may be, as is the case in this example, configured to assume that the location is the most recent determined location in the event that the portable device 20 is unable to determine the location. Thus, in this example, as the portable device 20 captures media inside the building, it assumes that the location is the second location 2220 and, as the media is captured, associates the captured media with the second client. Similar to media captured at the first location 2210, the media captured at the second location 2220 is also tagged with a client number of the second client.

Figure 2D:
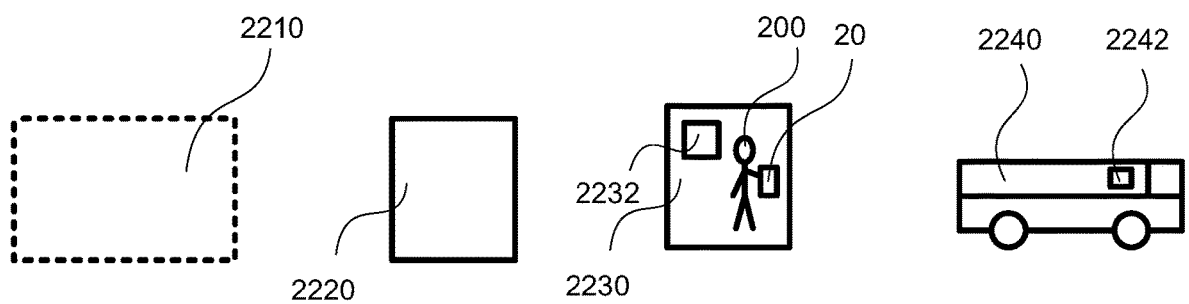

The step of dynamically determining S304 the location of the portable device 20 may comprise registering S314 a location tag arranged at the location, which will be described in relation to FIG. 2D. In FIG. 2D, the guard 200 has left the second location 2220 and arrives at the third location 2230. At the third location 2230, the guard 200 registers a location tag 2232. In this example, the registered location tag 2232 is used by the portable device 20 to determine the location of portable device 20. The portable device 20 may, as in this example, comprise information correlating location tags with locations. Thus, the portable device 20 in this example comprises information correlating the third location 2230 with the location tag 2232 arranged at the third location 2230. Alternatively, or additionally, the location tag 2232 may communicate the location directly to the portable device 20 by transferring information related to the location to the portable device 20. As the guard 200 is at the third location 2230, the portable device 20 captures media, and the media is tagged with a client number of the third client. The portable device 20 may determine it has left the third location in response to registering the location tag 2232 or a different location tag (not shown). Consecutive registrations of location tags may be registered after a predetermined amount of time, e.g. 5-30 minutes has passed. The predetermined amount of time may be set depending on an estimated amount of time that the guard 20 is scheduled to stay at the location (the third location in this example).

Figure 2E:
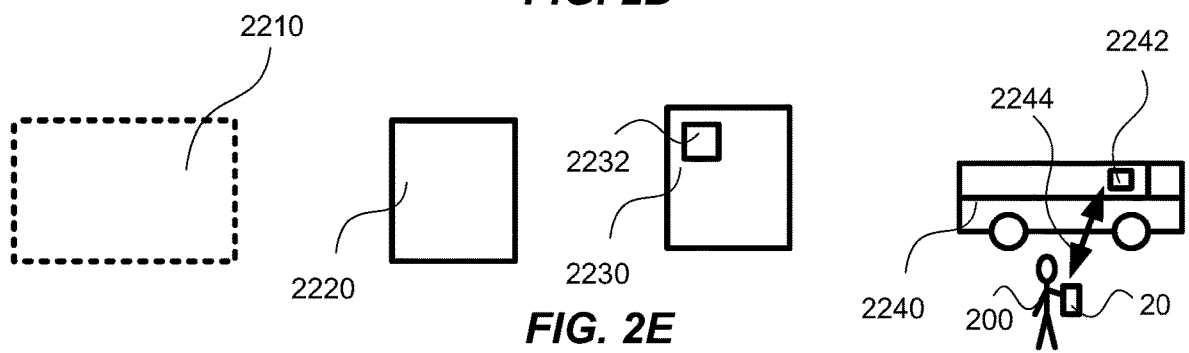

The step of dynamically determining S304 the location of the portable device 20 may comprise determining S312 a connection to a location beacon, which will be described in relation to FIG. 2E. In FIG. 2E, the guard 200 has left the third location 2230 and arrives at the fourth location 2240. As the guard 200 approaches and/or enters the bus, the portable device 20 detects a location beacon 2242 arranged at the bus. The detection is represented by double-arrow 2244 in FIG. 2E. In this example, the location beacon 2242 is a Wi-Fi base station. The location beacon 2244 may be configured to communicate the location to the portable device 20. Alternatively, or additionally, the portable device 20 may comprise information correlating locations with location beacons. Thus, portable device 20 in this example may comprise information correlating the location beacon 2244 with the fourth location 2240. After the guard 200 has entered the bus, the bus starts moving. Media captured as the guard 200 is at the fourth location 2240 (i.e. the bus) is associated with the fourth client, and as the media is captured it is tagged with information related to the fourth client (e.g., a client ID, client number, name of the client etc.). The guard 200 may be determined to have left the bus when the portable device 20 no longer can detect the location beacon 2242. In response to no longer detecting the location beacon 2242, the portable device 20 may be configured to determine it has left the fourth location after a predetermined amount of time, e.g. 5-30 minutes, has passed. It is to be understood that the predetermined amount of time may be set depending on an estimated time the guard 200 is scheduled to stay at the location (the fourth location in this example).

The method 30 may further comprise encoding media being associated with a party in accordance with a media quality preference of that party. In this way, the media quality may be tailored to the specific needs of the party. This may also save storage space in the portable device, since the media is not saved with an unnecessarily high video quality. The encoding of the media may involve compressing the media to a target compression level corresponding to the media quality preference. For instance, it may involve selecting encoding settings such that the resulting compression level of the media meets the target compression level. The encoding settings may involve one or more of a frame rate and a quantization parameter.

The method 30 may further comprise transmitting S318 media being associated with a party to a data storage in control by that party. In the example scenario described with reference to FIG. 2A-2E, this is done when the guard 200 has finished the route and returns to the docking station 210. The portable device 20 may then be placed in the docking station 210 by the guard 200. In this example, the captured media recordings are transmitted to a data storage in control by each respective client.

The method 30 may further comprise encrypting S320 media being associated with a party using an encryption key associated with that party. This may be done in order to increase security related to the transfer and/or the storage of the captured media, the captured media may be encrypted using an encryption key associated with each respective client. Hence, even in case the transmission is intercepted by an unauthorized person, the captured media may not be available to the unauthorized person. The captured media may be encrypted in connection with the media being captured and/or prior to the captured media being transferred to the data storage in control by the party. The data storage may, e.g., be a remote server, a local server, and/or a cloud storage. The step of encrypting S320 the captured media may comprise: generating a random encryption key; encrypting the captured media using the random encryption key; encrypting the random encryption key using a party encryption key; removing the random encryption key; and transmitting the encrypted random encryption key to a data storage in control by the party associated with the captured media.

Figure 1B:
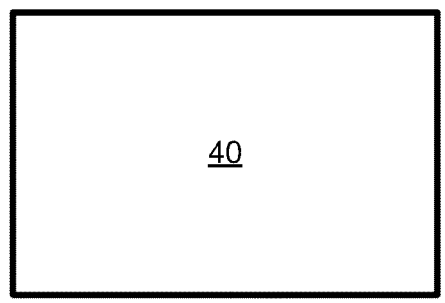
FIG. 1B illustrates a non-transitory computer-readable storage medium.

FIG. 1B illustrate a non-transitory computer-readable storage medium 40. The non-transitory storage medium 40 comprises program code portions that, when executed on a device (e.g., the portable device 10 described in relation with FIG. 1A) having processing capabilities, perform the method 30 described in relation to FIG. 3.

The person skilled in the art realizes that the present concepts by no means are limited to the preferred variants described above. On the contrary, many modifications and variations are possible within the scope of the appended claims.

For example, the functions of the portable device are described as being program code portions on a computer memory, however one or more of the functions may be hardware implemented and/or a combination of hardware and software implemented.

Additionally, variations to the disclosed variants can be understood and effected by the skilled person in practicing the claims, from a study of the drawings, the disclosure, and the appended claims.

The invention claimed is:

1. A method, performed in a portable device, for associating media captured by the portable device to a plurality of parties having requested the media to be captured at a plurality of locations, the method comprising:
  receiving information associating each of the plurality of parties with a location;
  dynamically determining a location of the portable device; and
  associating the media captured by the portable device to the plurality of parties, such that media currently being captured by the portable device is tagged with information identifying a party that according to the received information is associated with a current location of the portable device; and
  encrypting media being tagged with information identifying a party using an encryption key associated with that party.

2. The method according to claim 1, wherein the step of receiving information associating each of the plurality of parties with a location is performed when the portable device is connected to a docking station.

3. The method according to claim 1, wherein the step of dynamically determining the location of the portable device comprises one or more of:
  determining a geographic position of the portable device;
  determining a connection to a location beacon;
  registering a location tag arranged at the location; and
  comparing a present time with a guard schedule.

4. The method according to claim 1, further comprising:
  transmitting media being associated with a party to a data storage in control by that party.

5. The method according to claim 1, further comprising:
  comparing the dynamically determined location of the portable device and the information associating each of the plurality of parties with a location; and
  upon finding that the portable device enters a location associated with a party, starting capturing of a media recording.

6. The method according to claim 1, further comprising:
  comparing the dynamically determined location of the portable device and the information associating each of the plurality of parties with a location; and
  upon finding that the portable device leaves a location associated with a party, stopping capturing of a current media recording.

7. A portable device comprising:
  a sensor configured to capture media; and
  circuitry configured to execute:
    a receive function configured to receive information associating a plurality of parties with a location, each of the plurality of parties having requested media to be captured at a plurality of respective locations,
    a location function configured to dynamically determine a location of the portable device, and
    an association function configured to associate the media captured by the portable device to the plurality of parties, such that media currently being captured by the portable device is tagged with information identifying a party that according to the received information is associated with a current location of the portable device, and
    an encryption function configured to encrypt media being tagged with information identifying a party using an encryption key associated with that party.

8. The portable device according to claim 7, further comprising:
  a clock configured to determine a present time; and
  a location sensor configured to determine one or more of:
    a geographic position of the portable device, and
    a connection to a location beacon, and
  wherein the location function is configured to determine the location of the portable device based on one or more of:
    the geographic position of the portable device,
    the connection to the location beacon, and
    the present time.

9. The portable device according to claim 7, further comprising:
  a receiver configured to register a location tag arranged at the location; and
  wherein the location function is further configured to determine the location of the portable device by registering the location tag.

10. The portable device according to claim 7, wherein the circuitry is further configured to execute:
  a transmit function configured to transmit media being associated with a party to a data storage in control by that party.

11. The portable device according to claim 7, wherein the circuitry is further configured to execute:
- a comparison function configured to compare the dynamically determined location of the portable device and the information associating each of the plurality of parties with a location; and
- a capture function configured to start capturing of a media recording in response to finding that the portable device has entered a location associated with a party and/or to stop capturing of a current media recording in response to finding that the portable device has left a location associated with a party.

12. A non-transitory computer-readable storage medium comprising program code portions that, when executed on a device having processing capabilities, perform a method, in a portable device, for associating media captured by the portable device to a plurality of parties having requested the media to be captured at a plurality of locations, the method comprising:
- receiving information associating each of the plurality of parties with a location;
- dynamically determining a location of the portable device; and
- associating the media captured by the portable device to the plurality of parties, such that media currently being captured by the portable device is tagged with information identifying a party that according to the received information is associated with a current location of the portable device; and
- encrypting media being tagged with information identifying a party using an encryption key associated with that party.

* * * * *